United States Patent [19]

Hartmann et al.

[11] Patent Number: 5,199,394

[45] Date of Patent: Apr. 6, 1993

[54] CIRCUIT ARRANGEMENT FOR ELECTRONIC CONTROL OF AN INTERNAL COMBUSTION ENGINE

[75] Inventors: Uwe Hartmann; Udo Mai, both of Untergriesbach, Fed. Rep. of Germany

[73] Assignee: Vogt Electronic Ag, Erlau bei Passau, Fed. Rep. of Germany

[21] Appl. No.: 793,028

[22] Filed: Nov. 15, 1991

[30] Foreign Application Priority Data

Dec. 7, 1990 [DE] Fed. Rep. of Germany ....... 4039062

[51] Int. Cl.$^5$ .............................................. F02D 43/00
[52] U.S. Cl. ............................... 123/179.1; 123/179.5;
123/414; 123/476; 123/491; 123/615; 123/90.11
[58] Field of Search ................ 123/179.1, 179.3, 179.5, 123/491, 414, 424, 615, 619, 476, 90.11

[56] References Cited

U.S. PATENT DOCUMENTS

| | | | |
|---|---|---|---|
| 3,757,755 | 9/1973 | Carner | 123/414 |
| 4,494,519 | 1/1985 | Masuno | 123/615 |
| 5,101,780 | 4/1992 | Jones | 123/179.5 |

FOREIGN PATENT DOCUMENTS 3117144  11/1982  Fed. Rep. of Germany ... 123/179.5

*Primary Examiner*—Andrew M. Dolinar
*Attorney, Agent, or Firm*—Mason, Fenwick & Lawrence

[57] ABSTRACT

The invention provides a circuit for electronic control of an internal combustion engines including injection valves that can be activated electrically as a function of regulated variables such as crankshaft position, engine speed, exhaust-gas composition and engine torque. The circuit includes an electronic control unit with means to activate the intake valves, exhaust valves, injection valves and ignition device as a function of ignition duration and ignition timing. The control unit also includes a start-up program with which ignition sequences of the engine cylinders, intake valves, injection valves and ignition device can be activated for any desired cylinder position of an engine-start-up process. The circuit further includes a program memory, an engine-standstill detection circuit, and an absolute-value angle transmitter to which the engine-standstill detection circuit is responsive. The absolute-value angle transmitter includes a coding disk that is integrally connected with the crankshaft of the engine, circuitry for generating signals corresponding to the crankshaft position during standstill and during rotational movement, and circuitry for generating electrical signals corresponding to engine temperature, engine load and engine knocking. The signals are fed as regulated variables to the electronic control unit.

11 Claims, 3 Drawing Sheets

CIRCUIT ARRANGEMENT FOR ELECTRONIC CONTROL OF AN INTERNAL COMBUSTION ENGINE

BACKGROUND OF THE INVENTION

1. Field of the Invention

The invention relates to a circuit arrangement for electronic control of an internal combustion engine having an electronic control unit and an electronic memory with programs for the control unit, the control unit activating injection valves as a function of regulated variables.

2. Related Art

The use of electronic components, especially for control of internal combustion engines, e.g., in motor vehicles, is known. Such components are employed preferably in order to improve the functional sequence inexpensively in interaction with mechanical components. For example, in conventional internal combustion engines, the ignition behavior (ignition timing) is controllable by means of an electronically conditioned characteristic curve that depends on the speed of the engine.

From West German Patent 3,537,000 there is also known the use of a coding disk, which is provided with a Gray code, and of a sensor that samples the coding disk for static acquisition of the load acquisition determined for initiation of ignition in the case of a constant-pressure carburetor.

From West German Laid-open Application 3,630,272 there are also known devices for controlling an internal combustion engine in which devices the position of a transmitter disk that is connected to a shaft of the internal combustion engine and that has a perforation designed as marking is registered by a spatially fixed recording segment. A disadvantage of these known control devices is that they permit only the control of a single regulated variable (e.g., initiation of ignition).

In West German Patent 3,609,070 A1 there is described an electronic control system for internal combustion engines in which two central computing units interconnected by transmission lines are fed on the input side with individual variables characterizing the engine condition. In addition to the operating parameters indicating the load on the engine, engine rotation parameters that correspond to a predetermined crank angle position and that are acquired by a sampling device are fed to a central unit. In this process, a sampling sensor generates a reference crank angle signal which corresponds to a predetermined fixed crank angle position of an individual engine cylinder, whereby, in particular, only relative crank angle positions can be determined.

SUMMARY OF THE INVENTION

The object of the invention is to provide an electronic control system for internal combustion engines that avoids the aforesaid deficiencies, has high operating reliability and can be manufactured inexpensively.

This object is achieved according to the invention.

A circuit arrangement according to the invention for internal combustion engines has, an essential components, an electronic control unit (computer), an absolute-value angle transmitter, an engine-standstill detection circuit, an ignition-sequence circuit and a valve-control device. The activation of the electrical functions of the ignition-sequence circuit and of the valve-control device is effected by the electronic control unit.

For activation of the control unit, electrical signals conditioned by means of signal-shaping modules and representing regulated variables are fed to the computer by the absolute-value angle transmitter, which acquires the crankshaft angle in the dynamic and static condition. Furthermore, electrical signals, by means of which the angle transmitter code and the valve operating sequence are monitored, are fed to the control unit by the absolute-value angle transmitter and the valve controller.

With a fully electronic circuit device as proposed according to the invention for control of the internal combustion engine, the following advantages can be achieved:

1. an electrical starting aid (starter) can be dispensed with,
2. a mechanically driven ignition distributor can be dispensed with,
3. a camshaft controlling the intake and exhaust valves can be dispensed with and
4. a new type of control system of a two-stroke internal combustion engine, in which, in particular, the fuel-air mixture composition and the phase angle between fuel injection and piston position are electrically controllable as a function of the operating data.

The absolute-value angle transmitter consists of a wheel mounted on a crankshaft, which wheel has on its surface a clearly identifiable code, which is sampled by a sensor. Sampling by the sensor takes place, for example, inductively or optically. Preferably a unit-distance 9-bit Gray code, which permits determination of the crankshaft angle position to an accuracy of 0.7°, is used for the coding disk (wheel). The code pattern of the individual channels of the coding disk are sampled simultaneously by means of a multifunction sensor with integrated electronics and converted to electrical signals, which are conditioned for further processing. These electronically conditioned signals are fed sequentially to the control unit through a parallel-to-serial interface (parallel-to-serial converter).

The input of the engine-standstill detection circuit is connected with the input of the least significant bit of the parallel-to-serial converter. In the input stage of the engine-standstill detection circuit, the input signal is electronically differentiated and fed to a counter which, if a signal is not present on the input side, generates on the output side a signal corresponding to the engine condition (standstill or running), this signal being fed to the control unit. The simultaneous electronic evaluation of all (9 bit) code channels and of a single code channel, namely the least significant bit (1st bit), is thus advantageously possible in the control unit by a high-speed engine-standstill detection circuit and, in addition thereto, by means of a high-resolution crankshaft-angle position determination.

From the electrical signals fed to the control unit by the engine-standstill detection circuit and the absolute-value angle transmitter, the control unit activates individual injection valves, intake valves, exhaust valves and spark plugs, each associated with one cylinder and each consisting of an electric switch and a valve that is operated, for example, electromagnetically, or of an ignition device and a spark plug, referred to in the following as injection-valve module, intake-valve module, exhaust-valve module and ignition module. The order of sequential activation of the individual modules is a function of the total number of cylinders of the internal combustion engine and of the cylinder work cycles. According to subdivision of the cylinder work cycles into an ignition, cylinder-closing and cylinder-opening sequence, one crankshaft revolution is divided equally by half the number of cylinders, e.g., into three sectors of 120 each in the case of a six-cylinder internal combustion engine. As a substitute for the camshaft signal function, the sectors are switched over to the respective other group of cylinders by means of a flip-flop circuit after one crankshaft revolution. Thus ignition in cylinders 1, 2 and 3 takes place during the first revolution and in cylinders 4, 5 and 6 during the second revolution. Valve activation takes place corresponding to this ignition sequence. In such a subdivision into three 120° sectors, it is advantageous that the ignition timing and also the ignition duration can be matched precisely to the instantaneous engine requirements.

Each of the individual valve-control modules can also be activated in a manner corresponding to the actual engine condition. Thus optimum adjustment of the valve-closing and valve-opening times as well as of their phase angle relative to each other is possible at an time during operation of the engine. Because of the absolute, i.e., static, crankshaft angle acquisition, an electrically driven starting aid (starter) for starting such an electronically controlled internal combustion engine can be dispensed with. The following sequence of functions can be achieved during the starting and running-up phase:

switching-on of the operating voltage (e.g., with the ignition switch), build-up of an above-atmospheric pressure (about 3 atm) in the suction conduit by means of a compressor connected upstream from the throttle valve, brief opening of all intake and exhaust valves for scavenging, sequential opening of the intake valves for those cylinders in which the piston position is located just after the top dead point (before the bottom dead point) as well as those cylinders in which the piston position is located just before the top dead point, in order to admit air, closing of the intake valves, direct injection of fuel (activation of the injection valves) for the cylinders to be fired, the injection valves being activated by the control unit in such a way that a value for $\lambda = 1$ is obtained, firing of the cylinders in which the piston position is located just after the top dead point but before the bottom dead point, the ignition duration continuing until movement of the piston into the bottom dead point, subsequent firing of the pistons that have now passed the top dead point, the ignition duration continuing until the downward movement of the piston into the bottom dead point and transition (running up) to normal operation.

Only in normal operation is the throttle-valve position and the valve-module activation switched over from start to normal operation by the control unit, depending on the output signal of the engine-standstill detection circuit.

The electrically activated intake valve, exhaust valve and injection valve advantageously can be sequentially activated even during engine start, whereby the electrical power consumption is reduced.

Furthermore, two-stroke operation while avoiding the known disadvantages can be achieved by the proposal of intake valves, exhaust valves and injection valves as well as ignition modules that, by virtue of dispensing with a camshaft, are not mechanically coupled with each other. Gas exchange in the cylinder, i.e., scavenging, is achieved by simultaneous and brief opening of the intake and exhaust valves, whereby forced scavenging with air takes place. Thereafter fuel is injected into the cylinder by means of the injection valves. For this process the intake pressure determines the phase angle of the piston position for scavenging. By variation of the fuel intake pressure, the intake pressure can be selected so high that it corresponds to the internal cylinder pressure at the top dead point, whereby forced scavenging can be dispensed with. In this case, expulsion of the exhaust gas takes place approximately during the entire second stroke, whereas charging of the cylinder with fuel takes place only before the top dead point. Thereby flexible adaptation to the special engine requirements such a engine torque, engine power, fuel parameters and mixture composition is possible.

The invention provides a circuit for electronic control of an internal combustion engines including injection valves that can be activated electrically as a function of regulated variables such as crankshaft position, engine speed, exhaust-gas composition and engine torque. The circuit has an electronic control unit, an electronic memory, an engine-standstill detection circuit, and an absolute-value angle transmitter. The electronic control unit includes means to activate the intake valves, exhaust valves, injection valves and ignition device as a function of ignition duration and ignition timing, as well as a start-up program with which ignition sequences of the engine cylinders, intake valves, injection valves and ignition device can be activated for any desired cylinder position of an engine-start-up process. The electronic memory is connected with the control unit and stores control programs for the control unit. The absolute-value angle transmitter, to which the engine-standstill detection circuit is responsive, includes a coding disk that is integrally connected with the crankshaft of the internal combustion engine. The coding disk has a unit-distance code that is checked automatically by the control unit. The absolute-value angle transmitter further includes means for generating signals corresponding to the crankshaft position during standstill and during rotational movement, as well as means for generating electrical signal corresponding to engine temperature, engine load and engine knocking. The signals are fed as regulated variables to the electronic control unit.

BRIEF DESCRIPTION OF THE DRAWINGS

The invention will be explained in more detail in the following by means of a preferred practical example illustrated in drawings, wherein.

DETAILED DESCRIPTION OF THE PREFERRED EMBODIMENTS

Figure 3:
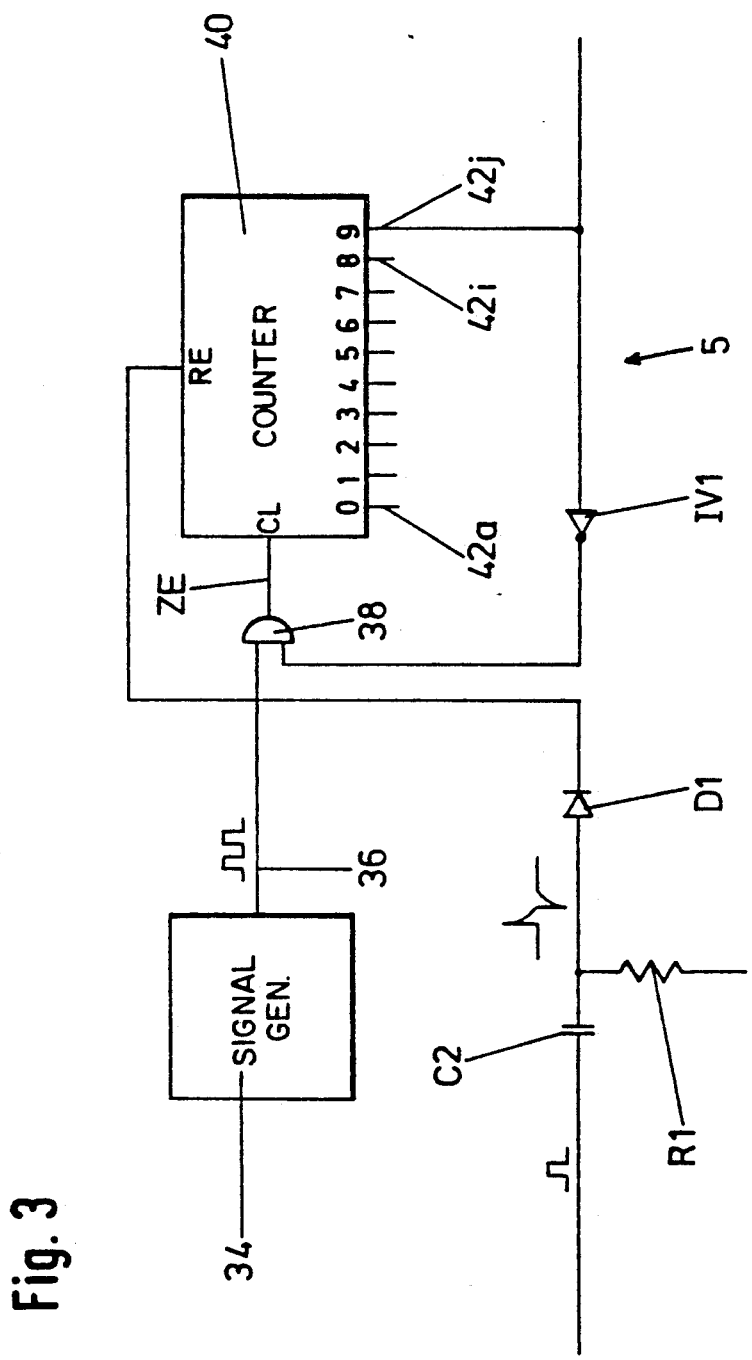

The circuit for the electronic control system of the internal combustion engine comprises a central control unit 2, an absolute-value angle transmitter 4, an electronic control-program memory 6, an engine-standstill detection circuit 5 illustrated in FIG. 3 and, corresponding to the number of engine cylinders to be activated, injection-valve modules 10, 11, intake-valve modules 12, 13, exhaust-valve modules 14, 15 and ignition modules 16, 17.

The control of all modules 10 to 17 is effected by the control unit 2 as a function of the instantaneous operating parameters of the internal combustion engine that are fed via data lines 7 to the control unit 2 by the absolute-value angle transmitter 4 and, in addition, by the sensors measuring the operating parameter of the internal combustion engine.

Figure 2:
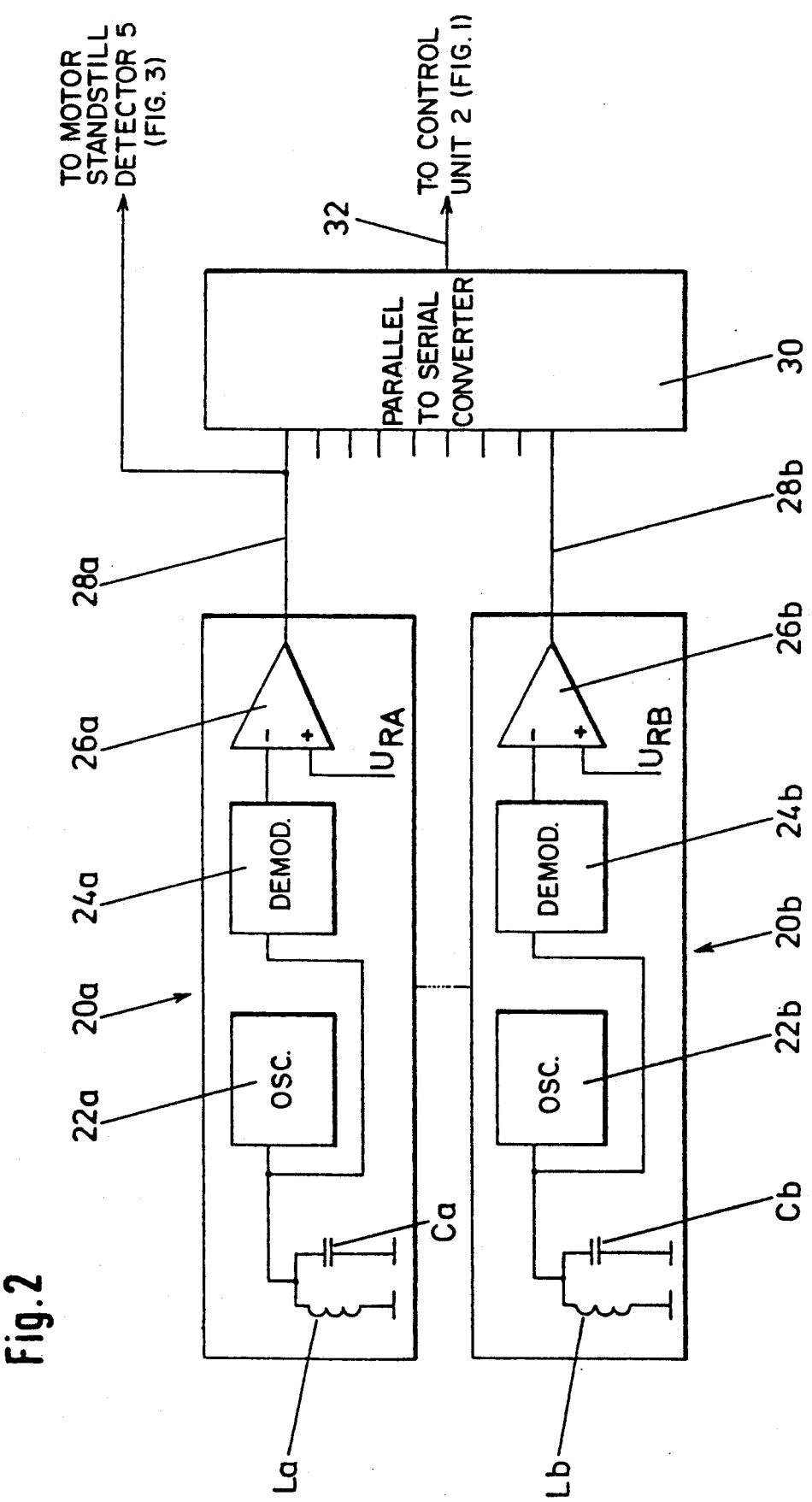
FIG. 2 shows a block diagram of the 9-bit absolute-value angle transmitter and FIG. 3 shows a block diagram of the circuit for engine standstill detection according to the invention.

The absolute-value angle transmitter 4 consists in total of nine signal-shaping modules, of which only two, 20a, 20b are illustrated in FIG. 2. The signal-shaping modules 20a, 20b each have an antiresonant circuit consisting of an inductor La or Lb and a capacitor Ca or Cb, an oscillator 22a or 22b and a demodulator 24a or 24b connected serially to the antiresonant circuit, the output of demodulator 24a or 24b being connected respectively with the inverting input of a comparator 26a or 26b. By interaction with a reference voltage $U_{RA}$ or $U_{RB}$ applied to the non-inverting input of the comparator 26a or 26b, the comparator 26a or 26b generates an output signal that is fed via a data line 28a or 28b to the parallel input of a parallel-to-serial converter 30. The parallel-fed angle position data of the absolute-value transmitter 4 are transmitted sequentially via a data line 32, which connects the parallel-to-serial converter 30 on the output side with the control unit 2 on the input side.

The input of the engine-standstill detection circuit 5 is connected with the least significant parallel input (1st bit) of the parallel-to-serial converter 30. The engine-standstill detection circuit 5 illustrated in FIG. 3 has a differentiating circuit connected with the input RE of the counter, this differentiating circuit consisting of the capacitor C2 and the grounded resistor R1. Together with the capacitor C2 and the resistor R1, a diode D1 is connected in the conducting direction with the resetting input RE of a counter 40. Furthermore, the engine-standstill detection circuit 5 has a signal generator 34, an AND logic element 38 and an inverter IV1. On the output side the signal generator 34 is connected via a signal line 36 with one input of the AND logic element 38. The second input of the AND logic element 38 is connected with the output of the inverter IV1, which is applied on the input side to the most significant counter output 42j (9th bit). On the output side the AND logic element 38 is applied to the counter input CL of the counter 40. When an input signal is present, a signal is applied to the resetting input RE of the counter 40, so that the counter 40 goes to low level on the output side at the most significant counter output 42j. Only if an input signal is not present, i.e., during engine standstill, does the counter 40 become active and go to high level on the output side, as a result of the pulse train injected by the signal generator 34 via the AND logic element 38 into the counter 40. The counter output 42j is connected with the input of the control unit 2.

Figure 1:
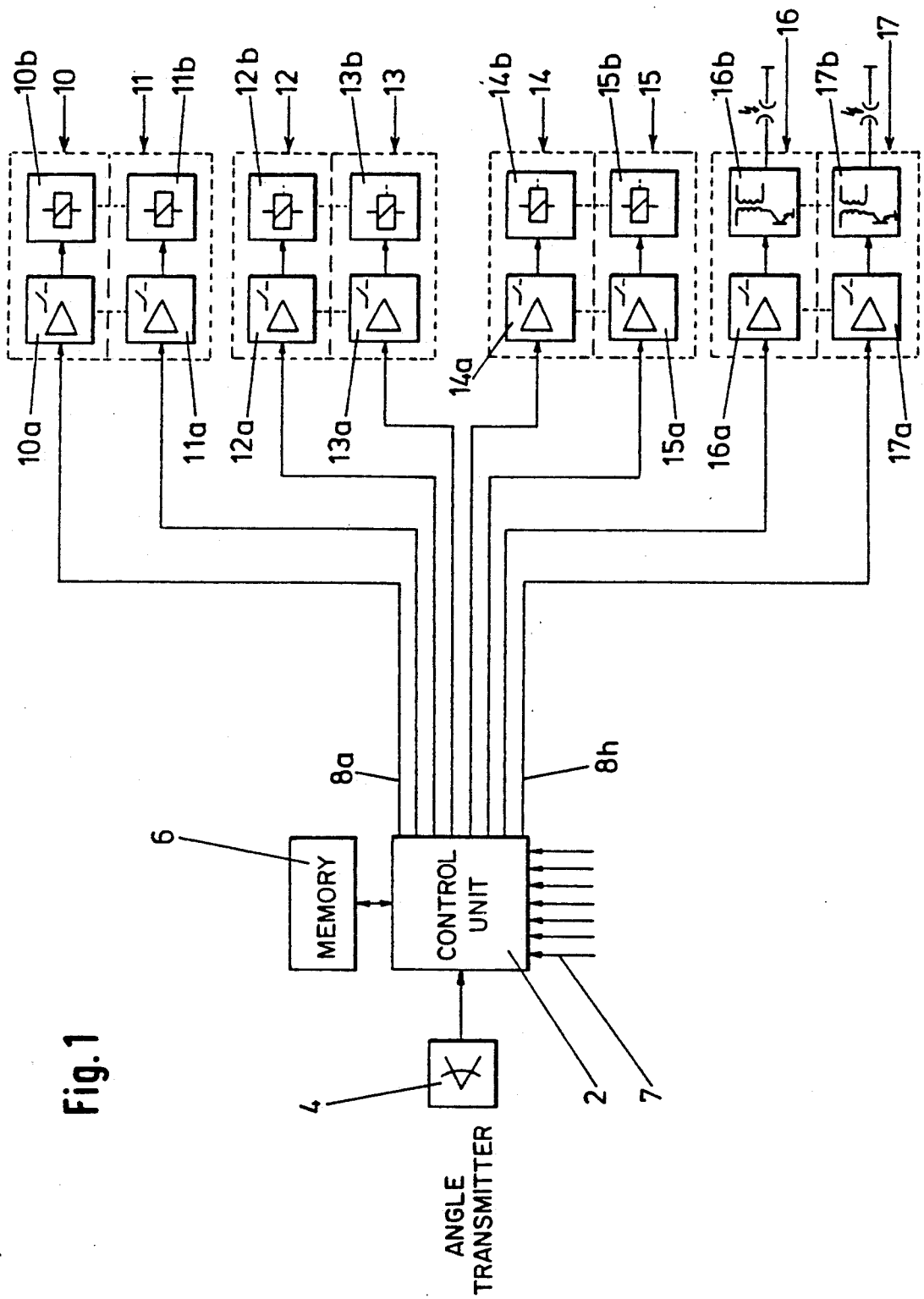
FIG. 1 shows a block diagram of an electronic control system according to the invention for internal combustion engines.

In the control unit 2, the input signals are converted to individual control commands by interaction with a control program that can be called from an electronic memory 6. These control commands are fed via data lines 8a to 8h to the individual modules (see FIG. 1), namely injection-valve modules 10 and 11, intake-valve modules 12 and 13, exhaust-valve modules 14 and 15 and ignition modules 16 and 17, each of which consists respectively of individual electric switches 10a, 11a, 12a, 13a, 14a, 15a, 16a and 17a and of an injection valve 10b and 11b, or an intake valve 12b and 13b, or an exhaust valve 14b and 15b or spark plugs 16b and 17b.

In normal operation of the internal combustion engine, the electrical signals corresponding to the instantaneous crankshaft position are fed to the control unit 2 by the absolute-value angle transmitter 4 via the parallel-to-serial converter 30. Simultaneously with these data indicating the absolute crankshaft position, a signal corresponding to a movement or to standstill of the crankshaft of the internal combustion engine is fed to the control unit 2 by the engine-standstill detection circuit 5. In addition to these regulated variables, seven other operating parameters of the internal combustion engine are communicated to the control unit via the data lines.

By interaction with the control-program subroutines to be transferred from the electronic memory 6 into the control unit 2, and with the actual operating parameters (regulated variables), control signals are generated in the control unit 2 and fed via the data lines 8a to 8h to the injection-valve modules 10 and 11, the intake-valve modules 12 and 13, the exhaust-valve modules 14 and 15 and the ignition modules 16 and 17.

The switches 10a to 17a disposed in the modules 10 to 17 are switched by the control signals communicated from the control unit 2 and respectively directly activate the injection valves 10b and 11b or the intake valves 12b and 13b or the exhaust valves 14b and 15b and the ignition devices 16b and 17b supplying the spark plugs with electrical energy.

We claim:

1. A circuit for electronic control of an internal combustion engines including injection valves that can be activated electrically as a function of regulated variables such as crankshaft position, engine speed, exhaust-gas composition and engine torque, the circuit comprising:
   a) an electronic control unit, the electronic control unit including:
      1) means to activate the intake valves, exhaust valves, injection valves and ignition device as a function of ignition duration and ignition timing; and
      2) a start-up program with which ignition sequences of the engine cylinders, intake valves, injection valves and ignition device can be activated for any desired cylinder position of an engine-start-up process;
   b) an electronic memory, connected with the control unit, the memory storing control programs for the control unit;
   c) an engine-standstill detection circuit; and
   d) an absolute-value angle transmitter to which the engine-standstill detection circuit is responsive, the absolute-value angle transmitter including:
      1) a coding disk that is integrally connected with the crankshaft of the internal combustion engine, the coding disk having a unit-distance code that is checked automatically by the control unit;
      2) means for generating signals corresponding to the crankshaft position during standstill and during rotational movement; and
      3) means for generating electrical signals corresponding to engine temperature, engine load and engine knocking;

the signals being fed as regulated variables to the electronic control unit.

2. The circuit of claim 1, wherein:
the unit-distance code is a 9-bit Gray code.

3. The circuit of claim 1, wherein:
the coding disk is divided into a number of sectors, the number of sectors corresponding to half the number of cylinders.

4. The circuit of claim 3, further comprising:
a flip-flop circuit for switching over the sectors to another group of cylinders.

5. The circuit of claim 1, wherein the absolute value angle transmitter includes:
at least one code channel; and
at least one signal shaping module allocated to a code channel.

6. The circuit of claim 5, wherein each of the signal shaping modules includes:
a) an antiresonant circuit including:
1) a capacitor; and
2) an inductor;
b) an oscillator;
c) a demodulator; and
d) a comparator having an inverting input, a non-inverting input, and an output;
1) the inverting input being connected with an output of the demodulator;
2) the non-inverting input being connected to a reference voltage; and
3) the output being connected with:
i) at least one input of a parallel-to-serial converter; and
ii) an input of the engine-standstill detection circuit.

7. The circuit of claim 6, wherein:
the control unit is connected with a sensor for engine-rotation detection; and
the least significant input bit of the parallel-to-serial converter is connected with the input of the engine-standstill detection circuit.

8. The circuit of claim 1, wherein the engine standstill detection circuit includes:
a) a signal generator having a signal generator output;
b) a counter having a reset input, a count input, and at least a most significant output;
c) an inverter having an inverter input receiving the most significant output from the counter, and an inverter output;
d) an AND element having a first input, a second input, and an output;
1) the first input receiving the signal generator output;
2) the second input receiving the inverter output; and
3) the output being connected to the count input of the counter;
e) a diode; and
f) a differentiating element including a capacitor and a resistor, the differentiating element feeding a differentiated input signal through the diode to the reset input of the counter.

9. The circuit of claim 1, wherein the control unit includes:
means for sequentially activating the intake valves, exhaust valves, and injection valves during the engine start-up process.

10. The circuit of claim 1, wherein the control unit includes:
means to activate the intake valves, exhaust valves and injection valves to operate the engine in a two-stroke work cycle.

11. The circuit of claim 1, wherein:
the coding disk is divided into a number of sectors, the number of sectors of one camshaft revolution being equal to the number of cylinders in the engine.

* * * * *